July 27, 1948.
F. D. SNYDER
2,445,806
INDUCTION MOTOR BRAKING SYSTEM
Filed May 10, 1946
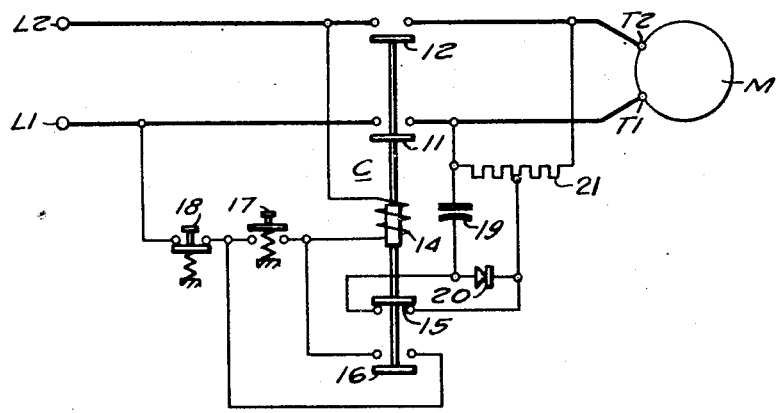
WITNESSES:
INVENTOR
Frederick D. Snyder.
BY
Paul E. Friedemann
ATTORNEY Patented July 27, 1948

2,445,806

UNITED STATES PATENT OFFICE 2,445,806

INDUCTION MOTOR BRAKING SYSTEM

Frederick D. Snyder, Milton, Mass., assignor to Westinghouse Electric Corporation, East Pittsburgh, Pa., a corporation of Pennsylvania Application May 10, 1946, Serial No. 668,693

2 Claims. (Cl. 318—212)

My invention relates to control systems for alternating current motors and has for its object to secure a quick braking or stopping of the motor immediately upon its disconnection from the power supply and with the aid of especially simple and inexpensive equipment.

To this end and in accordance with the invention I connect an impedance member across the motor terminals and one or several capacitors in series with a rectifying device across the impedance member and associate this series arrangement with the power control switch or contactor in such a manner that the capacitors are charged through the rectifying device by voltage from the impedance member when the motor is started and become discharged through the motor windings as soon as the power supply is interrupted. Since the capacitive discharge current is unidirectional, it imposes a braking effect on the motor so that the motor is stopped within the period of a few revolutions.

The invention will be understood from the following description of the embodiments illustrated in the drawing which shows the circuit diagram of a control system for a single phase motor.

According to the drawing, an alternating current motor M of the induction type has its terminals T1, T2 connected to respective line terminals L1, L2 under control by the main contacts 11, 12, respectively, of an electromagnetic contactor C. The control coil 14 of this contactor actuates also two interlock contacts 15 and 16 and is connected across the line terminals L1 and L2 through a normally open start contact 17 and a normally closed stop contact 18. Contacts 17 and 18 are preferably of the push button type for actuation by an attendant, or they may consist of limit switches or the like control organs to be actuated automatically by the machinery driven by the motor M.

Connected across the motor terminals T1 and T2 is a high ohmic resistor 21. Connected across part of the resistor are a capacitor 19 and a rectifier 20 in series relation to each other. The capacitor may consist of one or several units, for instance, of the electrolytic type. The rectifier may consist of a dry, junction type rectifier. The interlock contact 15 of contactor C is connected across the rectifier so as to bridge or short-circuit the rectifier when the main contacts of contactor C are open.

When the start contact 17 is depressed by the attendant, coil 14 becomes energized so that the contactor closes its main contacts in order to start the motor. The interlock contact 16 then establishes a self-holding circuit in parallel to the start contact 17 so that the contactor remains closed when contact 17 is thereafter released. The closing of contactor C has the effect of opening the short-circuit of the rectifier at contact 15. Consequently, capacitor is charged through the rectifier by direct current. When thereafter the stop contact 18 is depressed, the circuit of contactor coil 14 is interrupted so that the main contacts 11, 12 open and interrupt the power supply to the motor M. At the same time the contact 15 is closed and short-circuits the rectifier. As a result, the capacitor is permitted to discharge through the contact 15 and the resistor 21, thus impressing a voltage on the windings of the motor. Since this voltage is unidirectional, it produces a braking field in the motor and causes it to stop rapidly.

It will be recognized that the rectifying device carries current only during the short charging interval of the capacitor. Consequently, this rectifier has a relatively small current carrying capacity and may be given very small dimensions. The system requires no timing device of any kind because a very short time after the opening of the contactor the capacitive discharge current has exhausted itself, and the entire control circuit becomes deenergized.

In a motor control system designed in accordance with the above described embodiment, a four-pole motor of ½ H. P. was operated with an inertia load about equal to the rotor inertia. By providing the system with five series capacitors of 500 microfarads each, the motor could be brought to a dead stop within about three motor revolutions after the opening of the contactor.

The resistor 21 operates as a voltage divider. Thus, for instance, with 220 volts line voltage about 150 volts may be applied on the capacitors and with 440 volts line voltage a voltage of, for instance, 220 volts is sufficient across the capacitor and rectifier circuit.

The invention is of particular advantage for small motors up to about 1 H. P. because most of the known control systems of comparable braking performance are less economical for small size motors. However, if desired, the invention can likewise be applied to motors of larger size.

It will be understood by those skilled in the art that control systems according to the invention can be modified as regards the design, arrangement and type of control devices and with the aid of circuits different from those specifically described in this specification without departing from the essence of the invention and within the

I claim as my invention:

1. A motor control system, comprising an alternating current motor having terminals, a contactor connected to said terminals for supplying alternating current to said motor when closed, a voltage translating device connected across said terminals, a capacitor and a rectifier connected in series relation to each other across part of said device for charging said capacitor through said rectifier, and means controlled by said contactor and connected with said rectifier for causing said capacitor to discharge through said motor when said contactor is opened in order to brake the motor by capacitive discharge current.

2. A motor control system, comprising an alternating current motor having terminals, a contactor connected to said terminals for supplying alternating current to said motor when closed, a high-ohmic resistor connected across said terminals and disposed between said contactor and said motor, a capacitor and a rectifier connected in series relation to each other across part of said resistor for charging said capacitor through said rectifier when said contactor is closed, said contactor having a contact connected across said rectifier for short-circuiting the latter when said contactor is opened and removing the short-circuit when said contactor is closed.

FREDERICK D. SNYDER.

REFERENCES CITED

The following references are of record in the file of this patent:

UNITED STATES PATENTS

| Number | Name | Date |
|---|---|---|
| 2,119,205 | Doyle et al. | May 31, 1938 |
| 2,186,225 | Wrathall | Jan. 9, 1940 |
| 2,332,044 | Bell | Oct. 19, 1943 |